(12) United States Patent
Hofmann et al.

(10) Patent No.: US 11,056,947 B2
(45) Date of Patent: Jul. 6, 2021

(54) ACTUATOR WITH BRAKING DEVICE

(71) Applicant: AUMA Riester GmbH & Co. KG, Mullheim (DE)

(72) Inventors: Benjamin Hofmann, Heitersheim (DE); Robert Hofmann, Warngau (DE); Rudolf Bachert, Spechbach (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 115 days.

(21) Appl. No.: 16/603,398

(22) PCT Filed: Apr. 6, 2018

(86) PCT No.: PCT/EP2018/058863
§ 371 (c)(1),
(2) Date: Oct. 7, 2019

(87) PCT Pub. No.: WO2018/185287
PCT Pub. Date: Oct. 11, 2018

(65) Prior Publication Data
US 2021/0091632 A1 Mar. 25, 2021

(30) Foreign Application Priority Data
Apr. 7, 2017 (DE) .......................... 102017107519.4

(51) Int. Cl.
*H02K 7/102* (2006.01)
*H02K 5/136* (2006.01)
(Continued)

(52) U.S. Cl.
CPC ............ *H02K 7/102* (2013.01); *H02K 5/136* (2013.01); *H02K 7/108* (2013.01); *H02K 7/1166* (2013.01)

(58) Field of Classification Search
CPC ............ H02K 7/00; H02K 7/10; H02K 7/102; H02K 7/108; H02K 7/11; H02K 7/116;
(Continued)

(56) References Cited

U.S. PATENT DOCUMENTS 3,582,741 A * 6/1971 Arnold .................... H02K 17/30
318/759
4,216,848 A * 8/1980 Shimodaira .............. B66D 5/04
188/184
(Continued)

FOREIGN PATENT DOCUMENTS

DE 19519638 12/1996
DE 19935196 12/2000
(Continued)

*Primary Examiner* — Tran N Nguyen
(74) *Attorney, Agent, or Firm* — Volpe Koenig

(57) ABSTRACT

In order to increase the operational safety of an actuator (1) including an electric motor (2) and a transmission, preferably a non-self-locking transmission (3), a braking device is provided which allows the controlled, self-actuating displacement, by a retarding brake (5), of an actuating element connected to the actuator (1) via the transmission (3). The actuating element can be held in a fixed position by an additional holding device (6), even if the electric motor (2) fails. The actuator can be used to drive heavy sluice gates, in the event of a power failure, in a controlled free-fall operation at a constant rate of fall, or to hold them in a defined position. The holding device and the retarding brake can be combined in a common housing (11) to form a braking module (12) which can be designed to be used modularly with existing motor actuators and transmissions.

20 Claims, 2 Drawing Sheets

(51) Int. Cl.
*H02K 7/108* (2006.01)
*H02K 7/116* (2006.01)

(58) Field of Classification Search
CPC .......... H02K 7/1166; H02K 5/00; H02K 5/06; H02K 5/13; H02K 5/136
See application file for complete search history.

(56) References Cited

U.S. PATENT DOCUMENTS

| | | |
|---|---|---|
| 5,195,721 A | 3/1993 | Akerman |
| 6,488,260 B1 | 12/2002 | Dietz |
| 2002/0108747 A1 | 8/2002 | Dietz et al. |
| 2002/0170786 A1* | 11/2002 | Bucher .................. H02K 7/102 188/185 |
| 2016/0167922 A1 | 6/2016 | Lulfing |

FOREIGN PATENT DOCUMENTS

| | | |
|---|---|---|
| DE | 202015008215 | 1/2016 |
| EP | 1576713 | 9/2005 |
| WO | 2017001052 | 1/2017 |

* cited by examiner

Prior Art

ACTUATOR WITH BRAKING DEVICE

BACKGROUND

The invention relates to an actuator having an electric motor, which drives an output shaft by means of a transmission, wherein the output shaft is coupled or able to be coupled to an actuating element.

The invention also relates to a braking module, which is arrangeable for example between an electric motor and a transmission of such an actuator.

Actuators of this kind are known and are used for example in order to actuate actuating elements such as sluice gates, i.e. paddles for closing off and damming watercourses or sluices.

For driving sluice gates, it is conventional to configure the actuator in a self-locking manner, in order to prevent the sluice gate from falling shut automatically in the event of a power outage. However, in some applications, it is desired for the sluice gate, in the event of a power outage or some other failure of the actuator, to be able to fall shut in a controlled manner on due to dead weight, preferably with a constant rate of fall (what is known as the "failsafe mode"). Examples of values for such a freefall operation of a sluice gate are a rate of fall of about 5 cm/sec and a braking torque, necessary therefor, of about 17 Nm.

For the purposes of safe freefall operation of sluice gates, it has hitherto been usual to use hydraulic drives, in which controlled falling shut of the sluice gate in the event of a power outage is easy to realize. However, such drives have their own problems, for example the risk of the contamination of stretches of water with the hydraulic oil.

SUMMARY

The invention is based on the object of providing an alternative to hydraulic drives, wherein the alternative solution is intended to allow controlled automatic adjustment of the actuator, for example freefall operation as described above, in the event of a fault, and thus to ensure a high level of safety in operation.

To achieve this object, in the case of an actuator, one or more features according to the invention are provided. In particular, therefore, in order to achieve the object in an actuator of the type mentioned at the beginning, the invention provides that the actuator has a retarding brake, which is designed to exert a braking force on the actuating element, and that the actuator has a holding device, which is designed to exert a holding force on the actuating element. The combination of the retarding brake and holding device forms in this case a braking device according to the invention.

Here, a retarding brake can be understood in particular as being a brake that develops a braking force that depends on a speed, in particular a rotation speed or rate of rotation, of a mechanical part to be braked using the retarding brake.

For the retarding brake, i.e. in particular for a centrifugal brake, it is considered advantageous in this case for it to be designed such that it exerts the braking force in a manner transmitted by the transmission. This is because, in such a case, the rate of rotation upstream of the transmission, i.e. at the location of the retarding brake, is typically greater than downstream of the transmission. This is advantageous, since retarding brakes, in particular centrifugal brakes, can typically exert large forces at high rates of rotation.

Similarly, it is also the case for the holding device that it is advantageous for the latter to be designed such that it exerts the holding force in a manner transmitted by the transmission. This is because, in both cases, the transmission has an advantageous effect, since the holding and braking forces can be lower than when the retarding brake and the holding device, respectively, act directly on the actuating element. In addition, at the location of the actuating element, there is often no room for such braking devices. In other words, according to the invention neither the retarding brake nor the holding device has to act directly on the actuating element; rather, it is advantageous when the retarding brake and/or the holding device act(s) on parts of a drive train that drives the actuating element.

In the case of an actuator according to the invention, it is therefore possible, for example between the electric motor and the output shaft, for a holding device and a retarding brake to be arranged, which are each designed such that, as a result of the action of the holding device/retarding brake, holding/braking forces can be exerted on an output shaft and thus on the actuating element. As seen from the actuating element, the holding device and the retarding brake are, according to the invention, in this case arranged preferably on the other side of the transmission.

An actuator according to the invention has the advantage that, in a deenergized state of the electric motor, the actuating element can be effectively prevented from moving quickly in an uncontrolled manner, for example a sluice gate moved by the actuator can be prevented by the retarding brake from falling shut. To this end, the action of the retarding brake, for example on an input shaft of the transmission, is preferably configured according to the invention such that, in a deenergized state of the electric motor, a constant travel speed of the actuating element adjusted by the actuator, i.e. for example a sluice gate, arises.

It goes without saying that the drive force necessary for an automatic adjusting movement of the actuating element can be produced for example by a weight force of the actuating element or some other force acting on the actuating element, for example a water force.

An actuator according to the invention also has the advantage that, as a result of the action of the holding device, for example on the input shaft of the transmission, a holding force can be exerted on the actuating element. In this way, undesired adjustment of the actuating element can be prevented. It is thus possible, with the holding device, depending on the configuration in the energized or deenergized state, for the actuating element to be held in a desired position without the electric motor having to be used for this purpose.

According to the invention, the object can also be achieved by further advantageous embodiments that are described below and in the claims.

For example, according to one configuration of the invention, it is possible for the retarding brake to be configured as a centrifugal brake.

Compared with other retarding brakes, for example eddy current brakes, the use specifically of a centrifugal brake has the advantage that centrifugal brakes are comparatively inexpensive and can be used reliably even at high braking temperatures. In addition, a switching speed from which the brake engages is very easy to set, for example by an appropriate mechanical design of a spring of the centrifugal brake. Thus, in a centrifugal brake, different switching speeds can be realized comparatively easily by different springs. The centrifugal brake also has the advantage that a defined switching speed is able to be defined in the first place: below the switching speed, the centrifugal brake is inactive and causes only an increase in the moment of inertia of the actuator. It is also advantageous that centrifugal brakes, for example compared with eddy current brakes, are distinguished by a simple mechanical structure and have also proven successful in operation in practice.

In a further preferred configuration of the invention, the holding device is configured in an electrically actuatable manner. This is because remote control of the actuator, in particular remote-controlled retention of the actuating element, can be realized particularly easily.

In another configuration of the invention, the holding device is designed such that it counteracts two different drive directions. As a result of this configuration, an actuating element can be held particularly securely in its position by the holding device, since the latter can absorb adjusting forces that act from different directions.

According to yet another configuration of the invention, the holding device can be designed specifically such that it exerts the braking force in the energized state. In this configuration, the holding device can thus be designed in particular such that it does not exert a braking force in the deenergized state. This specific configuration is advantageous for example when the holding device is not intended to secure the position of the actuating element in the event of a power outage but is actually intended to release it, for example because, for this case, the actuating element is intended to move automatically, in a manner braked by the retarding brake. Such a scenario would arise for example in the case of a sluice gate, which, in normal operation, i.e. in the energized state, is held open (i.e. up) by the holding device, while, in the event of a power outage, it moves down in safe freefall operation and thus closes.

In a further preferred configuration of the invention, the retarding brake and/or the holding device is/are designed to act on an input shaft of the transmission. In order to allow a particularly compact design of the actuator, it may be advantageous here for the retarding brake and/or the holding device to be arranged between the electric motor and the transmission.

As a result of the provision according to the invention of a holding device, it is possible to dispense in particular with a self-locking transmission, which is often used in the prior art in order to prevent automatic adjustment of the actuating element. This is because, by use of the holding device, in normal operation, automatic adjustment of the actuating element, for example the falling-shut of a sluice gate operated by the actuator, can be effectively precluded.

Consequently, in a preferred configuration of the invention, the transmission of the actuator does not exhibit any self-locking, or is not configured in a self-locking manner. In other words, in this configuration, the transmission is drivable in two opposite directions. Such a configuration can be realized for example by a worm drive, in which the worm shaft has an appropriate pitch and/or is formed in a multi-start manner. However, according to the invention, it is also possible to use spur gear toothings, bevel gear toothings or other types of toothing for the same purpose. In particular, as a non-self-locking transmission according to the invention, an at least double-start worm gear can be used. Non-self-locking transmissions typically have greater efficiency than comparable, self-locking transmissions. Due to the better efficiency, it is therefore possible, as a result of the invention, to use small electric motors with a lower output than is usual in the prior art for such actuators. This is advantageous in order to reduce the size and the price of the actuator.

According to a further configuration of the invention, the holding device can be in the form of an electromagnetic holding brake. An advantage here is that high holding forces are able to be generated.

In a further configuration according to the invention, the holding device has a, preferably electrically actuatable, clutch and an anti-backdrive device. While, in this case, the electrically actuatable clutch can be present for example as an electromagnetic clutch, the anti-backdrive device can be connected for example to a hand wheel of the actuator. As a result of these configurations, a holding device according to the invention can be achieved with little constructional outlay. The configuration of the clutch as electrically actuatable allows simple remote control of the holding device.

According to yet another configuration of the invention, it is particularly favorable for the retarding brake to be configured as a centrifugal brake. In this case, the centrifugal brake can preferably be designed or dimensioned such that a braking effect is achieved only above one and a half times, preferably above twice, the nominal speed of the electric motor. The nominal speed can be provided for example by a speed of the electric motor that is used on average in normal operation or by a speed at which an output of the electric motor is at a maximum. An advantage with this configuration is that the electric motor of the actuator does not actually have to overcome the centrifugal brake in normal operation, since, in normal operation, speeds at which a braking effect with the centrifugal brake is already achieved do not arise.

Furthermore, as already explained above, the retarding brake can, according to one configuration of the invention, be designed such that, in the event of automatic adjustment of the actuating element by the retarding brake, a constant and/or maximum adjustment speed is able to be ensured.

In a further, particularly preferred configuration of the invention, the retarding brake and/or the holding device are in the form of a braking module, preferably with a common housing. The braking module can be configured in this case such that it is inserted or insertable into an interface between the electric motor and the transmission of the actuator. Here, it is advantageous for appropriate mechanical connecting points, i.e. for example the connecting points between the braking module and the transmission and between the electric motor and the braking module to be configured in a corresponding manner. Alternatively or in addition, it may be advantageous for clutches, in particular in a drive train, between the braking module and the transmission and between the electric motor and the braking module to be configured in a corresponding manner.

The configuration of a braking module has the advantage that, in this way, a braking device according to the invention can be fitted in a modular manner. For example, the braking module can be configured to be compatible with actuators that are already present, thereby saving costs in the development of the overall system.

Furthermore, the braking module according to the invention can have an electrical feedthrough. The electrical feedthrough can be designed for example such that it is still possible to electrically actuate the motor by way of a control unit even with the braking module inserted between the transmission and the electric motor, said control unit being arranged for example in a housing part of the transmission.

To this end, according to the invention, it is possible in particular to provide in each case mutually corresponding electrical contacts at the transmission, the electric motor and the braking module. These contacts allow, with the braking module inserted, preferably also with the braking module not inserted, electrical feedthrough of control signals from a control unit on the transmission side to the electric motor.

The configuration according to the invention of a braking module having a holding brake and a retarding brake, said braking module being arranged between the transmission and the electric motor of the actuator, has the further advantage that an explosion-proof configuration of the actuator is possible as a whole. For this purpose, in particular flame-arresting gaps can be formed at the braking module, for example in the direction of the transmission and/or in the direction of the electric motor.

Such gaps, which are also known as "explosion protection gaps", can be formed in a particularly advantageous manner at housing interfaces. Such gaps are designed, according to standards, such that for example a gas/air mixture ignited in an interior of the actuator by a short-circuit cannot ignite a gas/air mixture located outside the actuator through the gap. In this way, flashback from inside to outside can be prevented, this being required in many applications for safety reasons.

With the aid of a flame-arresting gap, an explosion-proof interior of the actuator can thus be created, in which electrical control signals can be transmitted safely. Therefore, in the advantageous configuration of the invention that has just been described, the braking module has at least one flame-arresting gap for creating an explosion-proof interior of the actuator. In this case, it is possible in particular for an electrical feedthrough to be formed within the explosion-proof interior.

Actuators as described at the beginning frequently already have an electrical connection between a control space and the electric motor, that is to say in particular a motor compartment, which is configured in an explosion-proof manner, wherein, for this purpose, often encapsulated cable bushings are formed at the electric motor or the transmission. As a result of the provision of an electrical feedthrough and of a flame-arresting gap at the braking module according to the invention, it is possible to continue to use such an already provided electrical connection when the braking module is inserted between the transmission and the electric motor, while maintaining the explosion protection. This indicates a further advantage of the arrangement according to the invention of the two brakes between the transmission and the electric motor in contrast to a likewise conceivable variant in which the holding device and/or the retarding brake are arranged on a side of the transmission that faces away from the electric motor.

According to a further configuration of the invention, it is favorable when the retarding brake, which can be configured in particular as a centrifugal brake, has brake shoes, which act on a, preferably outer, housing shell. This housing shell can be provided in particular by a housing of the above-described braking module. In this way, any heat generated during braking can be dissipated readily to the outside via the housing shell.

Common actuators as described at the beginning can have a hand wheel, which is able to be coupled to the transmission in a manner known per se in order to manually adjust the actuating element in emergency operation. To this end, a clutch is often provided, with which the electric motor is able to be uncoupled from the transmission such that said electric motor does not have to be carried along during manual operation. In order to prevent the hand wheel from being driven in reverse, for example when the actuating element automatically adjusts itself, an anti-backdrive device is often formed on the hand wheel.

In order to allow such a functionality also when using an actuator according to the disclosure, a further configuration of the invention provides at least one clutch on the actuator, in particular in the braking module, with which the holding device and/or an anti-backdrive device is able to be uncoupled from the transmission of the actuator, preferably in hand wheel operation.

According to a further configuration of the invention, the actuator, in particular the braking module, can have two clutches of the same type. These clutches can accordingly be formed in particular in a drive train of the actuator, preferably between the transmission and the electric motor, particularly preferably within the braking module.

A first of these two clutches, which is preferably arranged on the transmission side in the braking module, can be actuatable by a device, for example a hand wheel. With this clutch, the holding device is thus able to be uncoupled from the drive train, in particular the transmission. The second clutch, which is preferably formed at the electric motor, is, by contrast, provided for the event that the electric motor is used directly on the transmission without the interconnected braking module. Therefore, this second clutch is preferably configured such that it is likewise actuatable with the device, specifically when the motor is directly connected to the transmission. Thus, when the braking module according to the invention is not used, the electric motor is able to be uncoupled from the drive train, in particular the transmission, by this second clutch. Preferably, the two clutches of the same type are designed such that they are each actuatable manually and/or by a device, for example a hand wheel of the actuator, in particular manually. Here, it is particularly preferred when this device is formed at the transmission.

Also provided to achieve the object is a braking module, which can be inserted between an electric motor and a transmission of an actuator. With the braking module, a torque can be transmitted from the electric motor to the transmission, in particular such that the electric motor drives an actuating element of the actuator, said actuating element being coupled to an output shaft. Therefore, the braking module can transmit in particular a torque to a transmission of an actuator as described above and/or be coupled to an electric motor of such an actuator.

To achieve the object, the braking module has, according to the invention, a housing, a retarding brake and a holding device. The retarding brake and the holding device are in this case arranged preferably within the housing of the braking module. Furthermore, it is advantageous for the better configuration of the braking module for a wide variety of requirements when the holding device is configured separately from the retarding brake and not for instance formed by one and the same component, as in other possible embodiments.

The retarding brake and/or the holding device of the braking module can be configured as described above with reference to the actuator according to the invention. The braking module itself can also be configured as already described above with regard to the use within an actuator according to the invention.

For example, the retarding brake can be configured as a centrifugal brake and/or the holding device can be in the form of an electromagnetic holding brake.

Furthermore, the retarding brake can be designed to exert a braking force on an input shaft of a transmission. This transmission can be for example the transmission of an above-described actuator according to the invention.

Furthermore, the holding device can be designed to exert a holding force on an input shaft of a transmission. In this case too, the transmission can be the transmission of an above-described actuator according to the invention.

For a modular development of actuators, it is highly advantageous when the braking module has a transmission-side connecting device, which is configured to match a connecting device of an electric motor. The electric motor can be in particular the electric motor of an actuator according to the invention.

Furthermore, a motor-side connecting device of the braking module can be configured to match a connecting device of a transmission, wherein the transmission can be in particular that of an actuator according to the invention.

As a result of the provision of mutually matching connecting devices, for example as mechanical interfaces, in particular at the housing of the braking module on the side of the transmission or of the electric motor, it is possible to ensure that the braking module according to the invention can be used in a modular manner with an actuator having a transmission and an electric motor that is connectable to the transmission, without having to make adaptations to the transmission or the electric motor.

For the same reason, it is also advantageous for the braking module for transmitting a torque, for example from an electric motor to a transmission, to have a transmission-side clutch device, which is configured to match a clutch device of an electric motor. In this case, the braking module is preferably configured such that the electric motor is usable with the braking module. The transmission-side clutch device and a matching clutch device of the transmission can form for example the abovementioned first clutch.

If the electric motor is able to be coupled for example to the transmission by the clutch device, the braking module can consequently be coupled particularly easily to the transmission as a result of this configuration. In this case, the braking module is preferably configured such that the transmission is usable with the braking module.

With such a configuration, it is also possible for the transmission-side clutch device of the braking module to be able to be uncoupled from the transmission from the outside, in particular manually. As a result, it is possible in particular for the braking module and thus optionally also an electric motor connected to the braking module to be disconnected from the transmission using uncoupling devices already formed on the transmission, for example an uncoupling pin or the like.

In order now to allow similarly easy coupling of the braking module, in particular without any adaptations, to an electric motor, the braking module can have a motor-side clutch device, which is configured to match a clutch device of a transmission. In this case, the braking module is preferably configured such that the electric motor is usable with the braking module. The motor-side clutch device and a matching clutch device of the electric motor, in particular the abovementioned clutch device of the electric motor, can form for example the abovementioned second clutch.

The transmission-side clutch device and the motor-side clutch device of the braking module are thus formed in a manner matching one another. This allows two identical braking modules to be able to be coupled at their respective clutch devices.

An or the above-described transmission-side connecting device of the braking module can thus be configured to match an or the above-described motor-side connecting device of the braking module. Furthermore, an or the above-described transmission-side clutch device of the braking module can be configured to match an or the above-described motor-side clutch device of the braking module.

As a result of such configurations, the braking module can be connectable on the transmission side and/or motor side to a copy of the braking module. This ensures that the braking module is insertable easily between a transmission and an electric motor, for example of an actuator, without it being necessary to make adaptations to the transmission or to the electric motor.

Finally, in some applications, for example when use is made of an actuator in a gas field, it may be highly advantageous for the braking module to be configured such that, in an installation situation, at least one flame-arresting gap for creating an explosion-proof interior is provided by the braking module.

BRIEF DESCRIPTION OF THE DRAWINGS

The invention will now be described in more detail on the basis of exemplary embodiments, but is not limited to these exemplary embodiments.

Further exemplary embodiments result from combining the features of individual or several claims with one another and/or with individual or several features of the respective exemplary embodiments. In particular, it is thus possible to obtain configurations of the invention from the following description of a preferred exemplary embodiment in conjunction with the general description, the claims and the drawings.

In the drawings:

Figure 1:
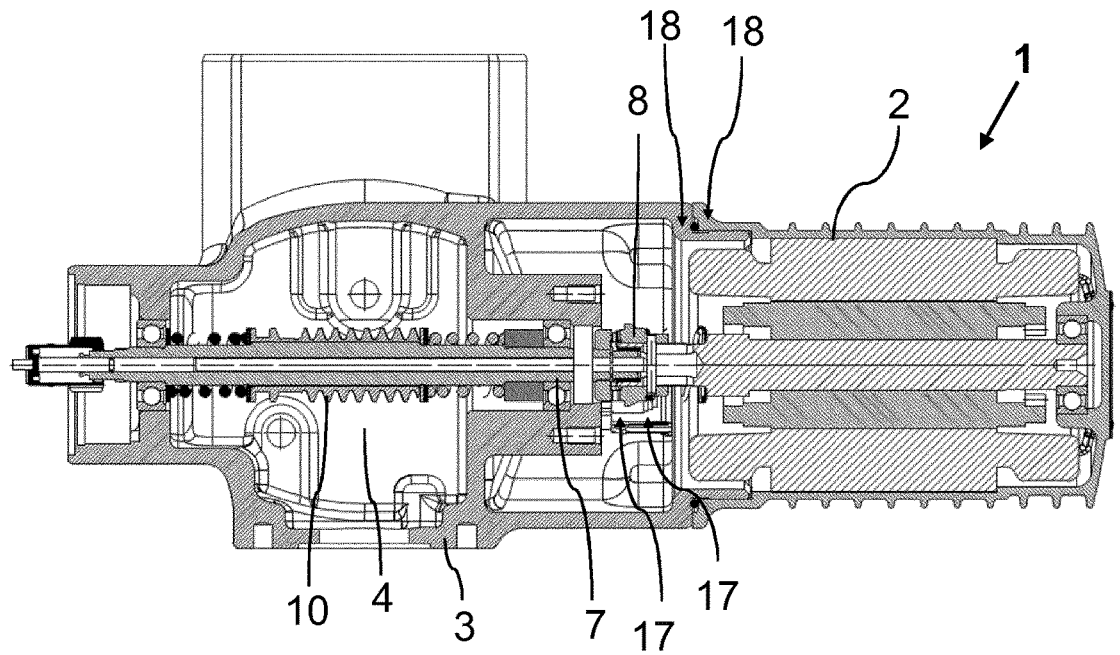
Figure 2:
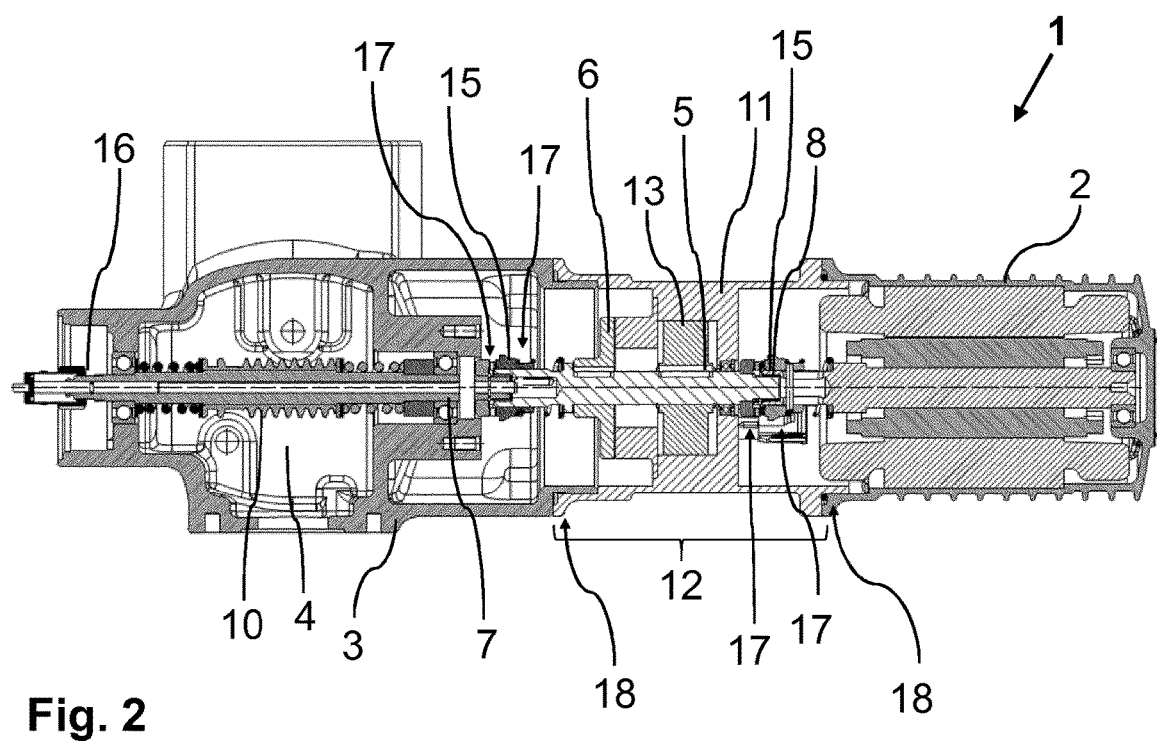
Figure 3:
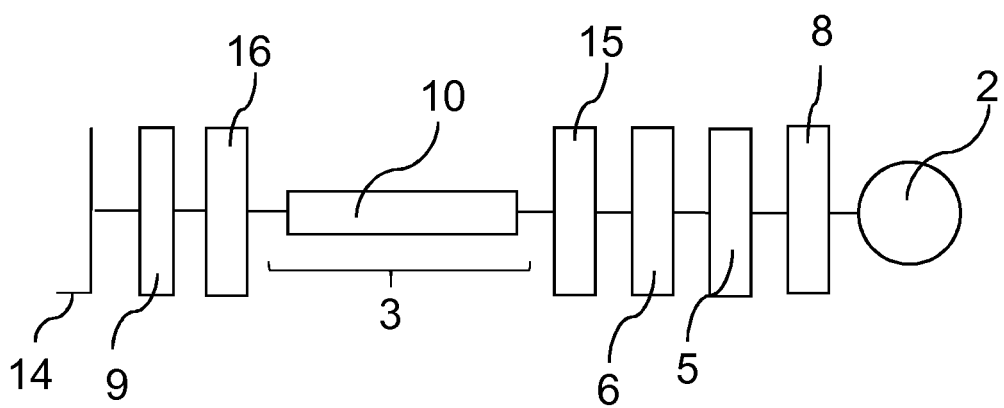
Figure 4:
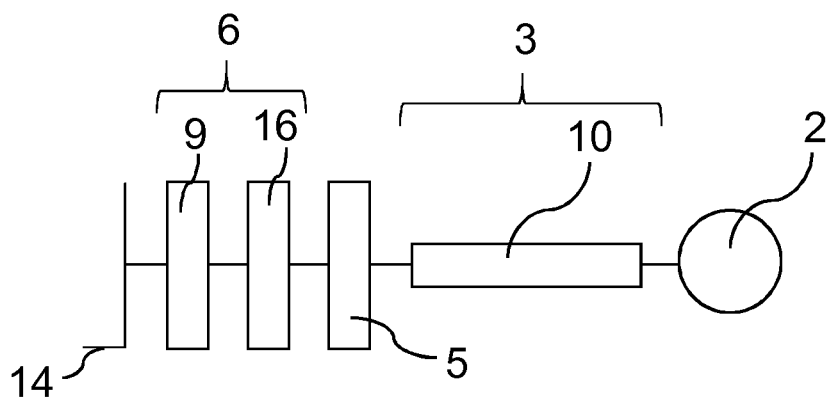
Figure 5:
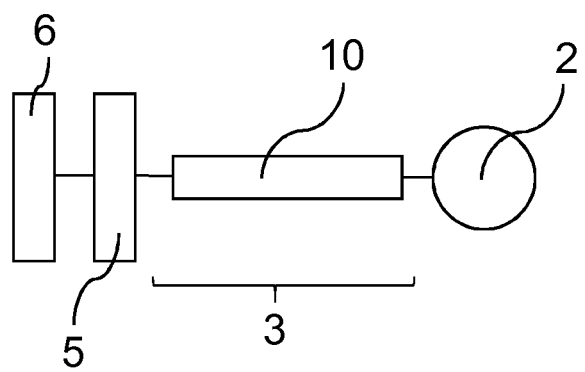

FIG. 1 shows a cross-sectional view of an actuator known per se having an electric motor and a transmission, which has a worm shaft, FIG. 2 shows a cross-sectional view of the actuator from FIG. 1, but with a braking module according to the invention inserted between the motor and the transmission, FIG. 3 shows a schematic illustration of a further possible configuration of an actuator according to the invention having a retarding brake, an electromagnetic holding brake, and a hand wheel that is connected to the transmission via an anti-backdrive device, FIG. 4 shows a schematic illustration of a further possible configuration of an actuator according to the invention having a retarding brake and a holding device formed by a clutch and an anti-backdrive device, and FIG. 5 shows a schematic illustration of a further possible configuration of an actuator according to the invention having a retarding brake and a holding device in the form of an electromagnetic holding brake.

DETAILED DESCRIPTION

In the following description of various embodiments of the invention, elements that correspond in terms of their function are provided with corresponding reference numerals, even if their design or shape differs.

FIG. 1 shows a cross-sectional view of an actuator 1, known per se, having an electric motor 2. The electric motor 2 drives an input shaft 7 of the transmission 3 in a manner transmitted by a clutch 8. Mounted centrally on the input shaft 7 is a hollow worm 10, which drives an output shaft 4, which is not shown in FIG. 1, although the reference sign 4 indicates the approximate position of the output shaft 4 in FIG. 1. The transmission 3 is thus formed by the input shaft 7, the worm shaft 10, the non-illustrated output shaft 4 and further elements. During operation, an actuating element is connected to the non-illustrated output shaft 4, said actuating element being adjusted by the actuator 1.

FIG. 2 shows the same actuator 1 as FIG. 1, but with a braking module 12 according to the invention inserted between the electric motor 2 and the transmission 3. Arranged within the housing 11 of the braking module 12 is a retarding brake 5, configured as a centrifugal brake, and an electromagnetic holding brake 6, wherein the latter serves as the holding device 6 according to the invention. By use of the brake shoes 13, the retarding brake 5 can exert a braking force on the inner side of the housing 11. Since the retarding brake 5 is connected fixedly to a shaft arranged centrally in the braking module 12 and this shaft is connected to the input shaft 7 of the transmission 3 via a clutch 15, the retarding brake 5 exerts a braking force on the actuating element in a manner transmitted by the transmission 3.

In a similar manner, a holding force can be exerted on the actuating element by brake pads of the holding device 6. Here too, the force flow extends from the braking surfaces of the holding device 6, via a central shaft of the braking module 12, a clutch 15 and the input shaft 7 of the transmission 3, into the transmission 3 and from there to the actuating element.

In the exemplary embodiment illustrated in FIG. 2, it is advantageous that the holding device 6 is configured as an electromagnetic locking brake, since; as a result, the holding device 6 can be actuated electrically. At the same time, the braking surfaces of the holding device 6 are configured specifically such that the holding device 6 acts in both possible directions of rotation of the central shaft of the braking module 12, i.e. counter to the two opposite drive directions of the electric motor 2.

In the exemplary embodiment illustrated in FIG. 2, the holding device 6 is also designed specifically such that, in the energized state, it exerts a holding force on the input shaft 7 of the transmission 3 and thus on the actuating element. Thus, if the electric motor 2 has moved the actuating element into a particular position during operation, by energizing the holding device 6, this position can be held securely without the electric motor 2 also having to provide a holding torque for this purpose. This is particularly advantageous for avoiding a continuous load on the electric motor 2.

The coupling of the shaft arranged centrally within the braking module 12 to the input shaft 7 of the transmission 3 via the central clutch 15 ensures that both the retarding brake 5 and the holding device 6 can act on the input shaft 7 of the transmission 3. As the cross-sectional view in FIG. 2 shows, for this purpose, the retarding brake 5 and the holding device 6 are arranged between the electric motor 2 and the transmission 3.

By way of the holding device 6 shown in FIG. 2, a possibility is therefore created of holding the actuating element securely in a certain position without using a self-locking transmission 3. Consequently, in the exemplary embodiment shown in FIG. 2, a worm shaft 10 can be used, which, in conjunction with the output shaft 4 (not shown), does not exhibit self-locking. Thus, the transmission 3 can be designed with optimized efficiency, this being advantageous, since in this way it is possible for example for the electric motor 2 to also have smaller dimensions.

The fact that the transmission 3 illustrated in FIG. 2 is able to be driven in both directions of rotation of the electric motor 2 has the result, inter alia, that a weight force generated by the actuating element acts, in a manner transmitted by the transmission 3, on the central shaft of the braking module 12 and thus both on the holding device 6 and on the retarding brake 5. In a deenergized state, i.e. when the holding device 6 does not currently exert a holding force, the actuating element can thus drive the transmission 3 by its weight force and drive the central shaft of the braking module 12 via the clutch 15. Consequently, the retarding brake 5 therefore rotates with the central shaft of the braking module 12, wherein the retarding brake 5 develops a braking force starting from a particular speed, which may in particular be twice a nominal speed of the electric motor 2. This braking force can be specifically selected to be so high (for example by suitable dimensioning of the brake shoes and the springs of the retarding brake 5) that the actuating element can adjust itself automatically only with a limited speed.

As a result of the actuating element being braked by the retarding brake, it is thus possible for example to ensure a safe freefall operation, as described at the beginning. Given correct dimensioning of the brake shoes 13 and of the spring of the retarding brake 5, it is possible in particular to ensure a constant adjusting or travel speed of the actuating element with automatic adjustment thereof.

As a comparison of the two FIGS. 1 and 2 shows, the braking module 12 has been inserted into an interface of the drive train, which extends from the electric motor 2 via the transmission 3 to the actuating element. The mechanical connecting point between the electric motor 2 and the transmission 3, which is formed by the clutch 8 in FIG. 1, is formed in a corresponding manner at the braking module 12 in FIG. 2: firstly, the clutch 8 already present at the electric motor continues to be used in that the central shaft of the braking module 12 engages in this clutch 8; moreover, the braking module 12 itself has, on the transmission side, a correspondingly configured clutch 15, in which the input shaft 7 of the transmission 3 engages.

As a result of the arrangement both of the retarding brake 5 configured as a centrifugal brake and of the holding device 6 within the common housing 11 of the braking module 12, the braking module 12 as a whole can be retrofitted very easily in a modular manner on already existing actuators, as shown for example in FIGS. 1 and 2.

From FIG. 2, it is also readily apparent how an electrical feedthrough and/or flame-arresting gaps at the braking module 12 can advantageously be used. Thus, at the braking module 12, a feedthrough is provided, with which control signals coming from the transmission 3 can be transmitted to the electric motor 2. For this purpose, already existing electrical interfaces at the transmission 3 and the electric motor 2, respectively, can be easily used. Because of flame-arresting gaps, which are arranged in the vicinity of the contact surfaces between the housing 11 of the braking module 12 and the electric motor 2 and the housing of the transmission 3, respectively, an explosion-proof interior extending from the transmission, through the braking module 12, to the electric motor 2 can be easily created.

It is also readily apparent from FIG. 2 how the brake shoes 13 of the retarding brake 5 act on the inside of the housing 11 of the braking module 12, wherein braking heat arises at this point, which is passed to the outside through the housing 11.

The actuator 1 illustrated in FIG. 2 has a total of three clutches 8, 15 and 16. The clutch 8 serves for uncoupling the retarding brake 5 and the holding device 6 from the transmission; by contrast, using the clutch 8, the electric motor 2 could be uncoupled from the braking module 12, although this is not necessary in normal operation. The left-hand clutch 16 serves for engaging a hand wheel (not illustrated in more detail), which can be mounted at the left-hand end of the input shaft 7 and, with the clutch 16 engaged, can be used to manually adjust the activating element. In particular, this hand wheel can be coupled to an anti-backdrive device, such that, in the exemplary embodiment illustrated in FIG. 2, the left-hand clutch 16 can serve to uncouple this anti-backdrive device from the transmission 3.

On closer inspection of FIG. 2, it is clear that the illustrated actuator 1 according to the invention has two clutches 8 and 15 of the same type, namely the clutch 8 between the electric motor 2 and the braking module 12 and the clutch 15 between the braking module 12 and the transmission 3. These two corresponding clutches 8, 15 are thus formed in the drive train of the actuator 1 between the transmission 3 and the electric motor 2.

As already explained, in FIG. 2, by use of the left-hand central clutch 15, in particular the holding device 6 can be uncoupled from the drive train, i.e. in particular from the transmission 3 arranged on the left-hand side, more specifically the input shaft 7. The right-hand clutch 8, by contrast, serves to uncouple the electric motor 2 from the drive train, i.e. in particular from the transmission 3. The central clutch 15 can additionally be actuated manually, namely with the hand wheel (not illustrated in more detail) via a push rod.

In FIG. 1, by contrast, the right-hand clutch 8, which is identical to the clutch 8 in FIG. 2, i.e. that clutch that is engaged with the motor shaft of the electric motor 2, is actuated by the push rod. This push rod extends in FIG. 1 through the center of the input shaft 7 and from the clutch 8 to the mounting point of the hand wheel at the left-hand end of the input shaft 7.

In FIG. 2, by contrast, with the same push rod, it is possible to actuate the central clutch 15, which connects the input shaft 7 of the transmission 3 to the central shaft of the braking module 12. The device that actuates the two clutches, namely the push rod extending centrally through the input shaft 7, is thus formed or mounted at the transmission 3.

The further FIGS. 3 to 5 schematically illustrate further possible configurations of the invention. Thus, the diagram shown in FIG. 3 first of all represents the configuration of an actuator 1 as illustrated in FIG. 2. From right to left, the electric motor 2 transmits, via a first clutch 8 and a second clutch 15, its driving force to the worm shaft 10 of the transmission 3. In this case, the holding device 6 and the retarding brake 5 are arranged between the two clutches 8, 15. Located on the left-hand side of the transmission 3 is a further clutch 16 with which a hand wheel and an anti-backdrive device 9 connected fixedly to the hand wheel can be coupled to the transmission 3.

FIG. 4 also shows an actuator according to the invention, since this has both a holding device 6 and a retarding brake 5. In contrast to the example in FIG. 3, however, the holding device 6 is formed by the combination of a clutch 16 with an anti-backdrive device 9. By use of the anti-backdrive device 9, it is thus possible, in the engaged state, for a holding force to be exerted on the transmission 3 and thus on the actuating element. If, by contrast, the clutch 16 is disengaged in FIG. 4, the actuating element, braked by the retarding brake 5, which continues to be connected to the transmission 3, can adjust itself automatically. In the process, the actuating element, in addition to the retarding brake 5, also drives the electric motor 2, which likewise remains connected to the transmission 3.

Finally, FIG. 5 shows a further possible configuration, in which the holding device 6 is formed by an electromagnetic holding brake. Such a brake can be switched on or off electrically, such that it is possible to dispense with a clutch entirely. Thus, it is also possible, in the exemplary embodiment shown in FIG. 5, to ensure that the electromagnetic holding brake can secure the actuating element in a particular position and, moreover, with the electromagnetic holding brake switched off, the retarding brake 5 can limit adjustment of the actuating element, either automatically or driven by the electric motor 2, to a safe travel speed. This shows that the configuration of clutches is not essential to the invention but can merely be advantageous.

It is also readily apparent from FIG. 2 that the braking module 12, which has a retarding brake 5 and a holding device 6, which are both arranged within a common housing 11, transmits a torque from the electric motor 2 to the transmission 3 of the actuator 1. To this end, the braking module 12 has a transmission element in the form of a shaft, at the two ends of which respective clutch devices are formed.

The transmission-side clutch device 17, arranged on the left-hand side in FIG. 2, of the braking module 12 is in this case configured specifically to match the clutch device 17, formed at the right-hand end of the worm shaft 10, of the transmission 3. The motor-side clutch device 17, arranged on the right-hand side in FIG. 2, of the braking module 12 is, by contrast, configured specifically to match the clutch device 17 formed at the left-hand end of the motor shaft of the electric motor 2.

The braking module 12 is mechanically connected, by threaded screws and fastening feedthroughs formed in a corresponding manner in the housing 11, to the housing of the transmission 3 on the transmission side and to the housing of the electric motor 2 on the motor side. These transmission-side and motor-side connecting devices 18 of the braking module 12 are in this case each formed so as to match corresponding connecting devices 18 of the electric motor 2 and of the transmission 3, respectively, by which the electric motor 2 and the transmission 3 can be connected together, as illustrated in FIG. 1.

For example, it is readily apparent from FIG. 2 that the cross-sectional profile of the housing 11 of the braking module 12 is formed on the transmission side in a similar manner to the transmission-side cross section of the housing of the electric motor 2, while the cross-sectional profile of the housing 11 of the braking module 12 is formed on the motor side in a similar manner to the motor-side cross section of the housing of the transmission 3. As a result of this configuration, it is thus possible for the braking module 12 to be inserted particularly easily between the electric motor 2 and the transmission 3 without adaptations having to be made to the transmission 3 or the electric motor 2 for this purpose. On account of this configuration, it would also be possible to arrange two identical braking modules 12 in succession and to connect them together.

As already discussed above, the braking module 12 forms, in the installation situation shown in FIG. 2, in each case at least one flame-arresting gap at a contact surface with the housing of the transmission 3 and at a contact surface with the housing of the electric motor 2. As a result, an explosion-proof interior is created, which extends in FIG. 2 from the interior of the transmission 3, through the braking module 12, into the interior of the electric motor 2.

In order to increase the operational safety of an actuator 1 having an electric motor 2 and a, preferably non-self-locking, transmission 3, a braking device is provided, which allows, by use of a retarding brake 5, controlled, automatic adjustment of an actuating element connected to the actuator 1 via the transmission 3, wherein preferably, by use of an additional holding device 6, the actuating element can be kept in a fixed position even in the event of a failure of the electric motor 2. An actuator 1 according to the invention can be used for example advantageously in order to move heavy sluice gates in the event of a power outage in a controlled freefall operation with a constant rate of fall or to keep them in a particular position. According to the invention, the holding device 6 and the retarding brake 5 can be combined in a common housing 11 to form a braking module 12, which can be configured such that it can be used in a modular manner with already existing servomotors 2 and transmissions 3.

LIST OF REFERENCE SIGNS

1 Actuator
2 Electric motor
3 Transmission
4 Output shaft
5 Retarding brake
6 Holding device
7 Input shaft (of the transmission)
8 Clutch (of the electric motor)
9 Anti-backdrive device
10 Worm shaft
11 Housing (of 12)
12 Braking module
13 Brake shoes
14 Hand wheel
15 Clutch (of the braking module)
16 Clutch (for engaging a hand wheel)
17 Clutch device
18 Connecting device

The invention claimed is:

1. An actuator (1) comprising:
an electric motor (2),
a transmission (3), the electric motor being configured to drive an output shaft (4) via the transmission (3), wherein the output shaft (4) is adapted to be coupled to an actuating element,
a retarding brake (5) configured to exert a braking force that acts on the actuating element, and
a holding device (6) configured to exert a holding force on the actuating element.

2. The actuator (1) as claimed in claim 1, wherein the retarding brake is configured to exert the braking force in a manner transmitted by the transmission (3).

3. The actuator (1) as claimed in claim 1, wherein at least one of the holding device (6) is electrically actuatable, the holding device (6) is configured to counteract two different drive directions, or the holding device (6) is configured to exert the holding force in an energized state.

4. The actuator (1) as claimed in claim 1, wherein at least one of the retarding brake (5) or the holding device (6) are designed to act on an input shaft (7) of the transmission (3).

5. The actuator (1) as claimed in claim 1, wherein the transmission (3) is drivable in two opposite directions.

6. The actuator (1) as claimed in claim 1, wherein the holding device (6) comprises an electromagnetic holding brake, or the holding device (6) comprises a clutch (8, 15, 16) and an anti-backdrive device (9).

7. The actuator (1) as claimed in claim 1, wherein the retarding brake (5) is configured as a centrifugal brake in which a braking effect is achieved only above one and a half times a nominal speed of the electric motor (2).

8. The actuator (1) as claimed in claim 1, wherein at least on of the retarding brake (5) or the holding device (6) are in a braking module (12), and the braking module (12) is configured to be inserted into an interface between the electric motor (2) and the transmission (3).

9. The actuator (1) as claimed in claim 8, wherein the braking module (12) includes at least one of an electrical feedthrough or at least one flame-arresting gap for creating an explosion-proof interior of the actuator (1).

10. The actuator (1) as claimed in claim 9, wherein the retarding brake (5) includes brake shoes (13) that act on a housing shell (11) of the braking module (12).

11. The actuator (1) as claimed in claim 1, further comprising a clutch (8), with which at least one of the holding device (6) or an anti-backdrive device, is able to be uncoupled from the transmission (3) of the actuator (1).

12. The actuator (1) as claimed in claim 1, further comprising two clutches (8, 15) of a same type, which are formed in a drive train of the actuator (1) between the transmission (3) and the electric motor (2) the holding device (6) is able to be uncoupled from the drive train by a first of the two clutches, and the electric motor (2) is able to be uncoupled from the drive train be a second of the two clutches (8, 15).

13. A braking module (12) for transmitting a torque from an electric motor (2) to a transmission (3), comprising a housing (11) and an actuator (1) as claimed in claim 1 arranged within the housing (11), wherein the retarding brake (5) comprises a centrifugal brake and the holding device (6) comprises an electromagnetic holding brake.

14. The braking module (12) as claimed in claim 13, wherein the retarding brake (5) is configured to exert a braking force on an input shaft (7) of the transmission (3), and the holding device (6) is configured to exert a holding force on an input shaft (7) of the transmission (3).

15. The braking module (12) as claimed in claim 13, wherein a transmission-side connecting device (18) of the braking module (12) is configured to match a connecting device (18) of the electric motor (2), and a motor-side connecting device (18) of the braking module (12) is configured to match a connecting device (18) of the transmission (3), and a transmission-side clutch device (17) of the braking module (12) for transmitting a torque is configured to match a clutch device (17) of the electric motor (2), and a motor-side clutch device (17) of the braking module (12) for transmitting a torque is configured to match a clutch device (17) of the transmission (3).

16. The braking module (12) as claimed in claim 15, wherein an or the transmission-side connecting device (18) of the braking module (12) is configured to match the motor-side connecting device (18) of the braking module (12), and the transmission-side clutch device (17) of the braking module (12) is configured to match an or the motor-side clutch device (17) of the braking module (12), such that the braking module (12) connectable on at least one of the transmission side or motor side to a copy of the braking module (12).

17. The actuator as claimed in claim 1, wherein the holding device (6) is configured to exert the holding force in a manner transmitted by the transmission (3).

18. The actuator as claimed in claim 1, wherein the retarding brake (5) comprises a centrifugal brake.

19. The actuator as claimed in claim 18, wherein in case of automatic adjustment of the actuating element, a constant adjustment speed is provided by the centrifugal brake (5).

20. The actuator as claimed in claim 1, wherein at least one of the retarding brake (5) or the holding device (6) is arranged between the electric motor (2) and the transmission (3).

* * * * *